United States Patent
Fang et al.

(10) Patent No.: US 11,655,351 B2
(45) Date of Patent: *May 23, 2023

(54) METHOD FOR RECYCLING WASTE POLYESTER WITH CONTINUOUS ALCOHOLYSIS AND TRANSESTERIFICATION

(71) Applicant: AVANTGARDE (SHANGHAI) ENVIRONMENTAL TECHNOLOGY CO., LTD., Shanghai (CN)

(72) Inventors: Huayu Fang, Shanghai (CN); Enbin Zhu, Shanghai (CN); Dubin Wang, Shanghai (CN); Guoqing Yu, Shanghai (CN); Jincheng Chen, Shanghai (CN); Tianyuan Li, Shanghai (CN); Jiantong Wu, Shanghai (CN); Jianhua Chen, Shanghai (CN); Shengyao Lin, Shanghai (CN)

( * ) Notice: Subject to any disclaimer, the term of this patent is extended or adjusted under 35 U.S.C. 154(b) by 250 days.

This patent is subject to a terminal disclaimer.

(21) Appl. No.: 17/013,671

(22) Filed: Sep. 7, 2020

(65) Prior Publication Data

US 2021/0024717 A1 Jan. 28, 2021

Related U.S. Application Data

(63) Continuation-in-part of application No. PCT/CN2020/076455, filed on Feb. 24, 2020.

(51) Int. Cl.
*C08J 11/16* (2006.01)
(52) U.S. Cl.
CPC ............ *C08J 11/16* (2013.01); *C08J 2367/00* (2013.01)

(58) Field of Classification Search
CPC ........ C08J 11/02; C08J 11/24; C08J 2367/00; C08J 11/16
USPC ....... 521/48.5; 528/190, 192, 193, 194, 271, 528/272, 274
See application file for complete search history.

(56) References Cited

U.S. PATENT DOCUMENTS

| | | | |
|---|---|---|---|
| 6,472,557 B1 * | 10/2002 | Pell, Jr. ................... | C07C 67/03 560/96 |
| 2021/0024718 A1 * | 1/2021 | Fang ........................ | C08J 11/22 |
| 2021/0040287 A1 * | 2/2021 | Fang ........................ | C08J 11/24 |

* cited by examiner

*Primary Examiner* — Terressa Boykin

(57) ABSTRACT

The invention present invention belongs to waste polyester recycling technology field and relates to a method and a device for recycling waste polyester, in particular to a method and a device for recycling waste polyester by modified chemical method to recover waste polyester to prepare dimethyl terephthalate (DMT). The recycling method of the present invention uses a process of continuous feeding, continuous alcoholysis and continuous transesterification. It can make the material undergo homogeneous alcoholysis in the melted state, and the required alcoholysis time is short. Because more than two alcoholysis tanks are used in series for continuous alcoholysis, the product quality of alcoholysis product is stable. When the alcoholysis product is continuously transesterified, it avoids the occurrence of side reactions and the unstable quality of the transesterified product, and the purity and yield of recycling product of waste polyester are greatly improved.

12 Claims, 1 Drawing Sheet

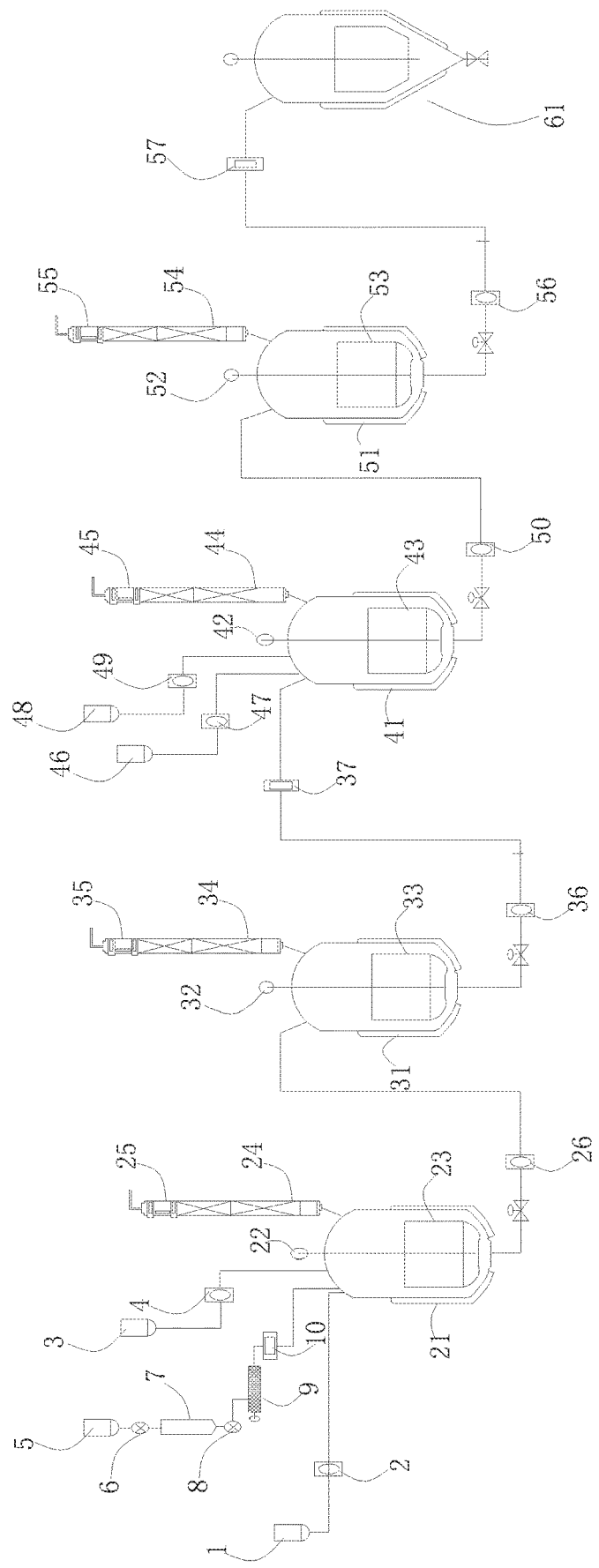

METHOD FOR RECYCLING WASTE POLYESTER WITH CONTINUOUS ALCOHOLYSIS AND TRANSESTERIFICATION

BACKGROUND OF THE INVENTION

1. Field of the Invention

The invention present invention belongs to waste polyester recycling technology field and relates to a method and a device for recycling waste polyester, in particular to a method and a device for recycling waste polyester by modified chemical method to recover waste polyester to prepare dimethyl terephthalate (DMT).

2. Description of the Prior Art

Polyester (polyethylene terephthalate, PET) is the most produced synthetic fiber material, widely used in fiber, textile fabrics, clothing, polyester bottles, films, sheets and other products. Based on the needs of enhanced environmental awareness, resource conservation and sustainability, how to deal with the scraps produced in the manufacture of polyester products and the waste after the use of polyester products has become an urgent problem to be solved, and the recycling of waste polyester has become a development direction of green textile.

At present, the recycling methods of waste polyester mainly include physical recycling and chemical recycling. The physical recycling methods are relatively simple and economic, but the performance of the recycled product is poor. The chemical recycling methods mainly include hydrolysis method, alcoholysis method, ammonolysis method, amine hydrolysis method, thermal cracking method and other degradation methods. An important direction of the chemical recycling method is the alcoholysis of waste polyester with ethylene glycol (EG) into bishydroxy terephthalate (BHET) or oligomers, and then through transesterification in methanol to produce Dimethyl Terephthalate (DMT) and ethylene glycol. Pure DMT is obtained through purification and used as a raw material for polyester production, while methanol and ethylene glycol are used in the reaction system through purification and recycling to achieve the recycling of waste polyester.

The U.S. Pat. No. 6,706,843B1 provides a method for recycling waste polyester to produce DMT. The patent uses EG with a weight of 0.5-20 times the weight of the waste polyester and alcoholizes the waste polyester in the presence of a catalyst and at a temperature of 175° C.-190° C. Then, the alcoholysis product is distilled and concentrated to distill out EG, and the weight ratio of EG to waste polyester in the concentrated alcoholysis product is controlled in 0.5-2. The concentrated alcoholysis product is then transesterified with methanol to form DMT and purified by rectification to produce pure DMT. This technology adopts solid polyester and liquid EG for alcoholysis reaction. The alcoholysis reaction is a solid-liquid heterogeneous reaction with long reaction time. At the same time, in the alcoholysis process of waste polyester, the amount of EG used for alcoholysis is large. In order to carry out the transesterification reaction well and avoid mixing excess EG in the final product to affect the quality of DMT product, it is necessary to distill out part of the EG in the alcoholysis product, which has a process of concentrating the alcoholysis product, leading to an increase in input equipment and energy consumption.

SUMMARY OF THE INVENTION

Therefore, it is necessary to provide a method for recycling waste polyester with continuous alcoholysis and transesterification to solve the problems of long alcoholysis time, uneven quality, unstable quality of alcoholysis and transesterification product, and the need to configure more concentration equipment during intermittent reaction in the prior art.

In order to achieve the above objective, the inventor provides a method for recycling waste polyester with continuous alcoholysis and transesterification includes a plurality of steps as follows:

Material pretreatment: drying and deoxygenating the waste polyester to obtain a waste polyester as raw material;

Alcoholysis: the waste polyester raw material, alcoholysis agent and alcoholysis catalyst are continuously fed into the first alcoholysis tank in the melted state for the first alcoholysis to obtain melt A. Then, the melt A is ontinuously fed into the second alcoholysis tank for the second alcoholysis to obtain an alcoholysis product. The first alcoholysis tank and the second alcoholysis tank are connected in series;

Transesterification: including transesterification reaction carried out in the transesterification tank to obtain the transesterification product, and crystallization, separation and purification of raw DMT. The transesterification tank includes a first transesterification tank and a second transesterification tank. The first transesterification tank and the second transesterification tank are connected in series. The alcoholysis product, the transesterification agent, and the transesterification catalyst are continuously fed into the first transesterification tank in the melted state for the first transesterification to obtain the transesterification product. The second transesterification tank is configured to load the continuously fed transesterification product which undergoes a second transesterification therein.

Compared with the prior art, the present invention includes at least the following beneficial effects:

The recycling method of the present invention uses a process of continuous feeding, continuous alcoholysis and continuous transesterification. It can make the material undergo homogeneous alcoholysis in the melted state, and the required alcoholysis time is short. Because more than two alcoholysis tanks are used in series for continuous alcoholysis, the product quality of alcoholysis product is stable. When the alcoholysis product is continuously transesterified, it avoids the occurrence of side reactions and the unstable quality of the transesterified product.

BRIEF DESCRIPTION OF THE DRAWINGS

The drawing shows a process flow diagram of the continuous alcoholysis and continuous transesterification recovery method of waste polyester according to the specific embodiment of the present invention.

DESCRIPTION OF THE PREFERRED EMBODIMENTS

The technical content, structural features, achieved objectives and effects of the technical solution of the present disclosure will be described in detail below.

The method for recycling waste polyester with continuous alcoholysis and transesterification provided by the present disclosure includes the following steps:

Material pretreatment: drying and deoxygenating waste polyester material to obtain waste polyester as raw material.

Alcoholysis: the waste polyester, alcoholysis agent and alcoholysis catalyst are continuously fed into the first alcoholysis tank in the melted state for the first alcoholysis to obtain melt A. Then, the melt A is ontinuously fed into the second alcoholysis tank for the second alcoholysis to obtain alcoholysis product. The first alcoholysis tank and the tank alcoholysis tank are connected in series.

Transesterification: including carrying out transesterification reaction in the transesterification tank to obtain the transesterification product, and crystallization, separation and purification of raw DMT. The transesterification tank includes a first transesterification tank and a second transesterification tank. The first transesterification tank and the second transesterification tank are connected in series. The alcoholysis product, the transesterification agent, and the transesterification catalyst are continuously fed into the first transesterification tank in the melted state for the first transesterification to obtain the transesterification product. The second transesterification tank is configured to load the continuously fed transesterification product which undergoes a second transesterification therein.

Through extensive research, the inventor has discovered that the moisture content and surface oxygen of waste polyester have a great impact on the subsequent alcoholysis and reaction product. However, if the waste polyester is dried, dewatered and deoxygenated by conventional techniques before the waste polyester is melted in the screw extruder, the possibility of side reactions can be greatly reduced, thus improving the purity of subsequent alcoholysis product and transesterification product as well as the reaction efficiency.

The waste polyester raw material, alcoholysis agent and alcoholysis catalyst are continuously fed into the first alcoholysis tank in a melted state for the first alcoholysis. For example, the screw extruder is used to heat and melt the waste polyester, so that the waste polyester is impelled and melted in the screw extruder. The conveying volume of the melted waste polyester can be adjusted by rotation speed of the screw extruder based on the liquid level in the alcoholysis tank to keep the liquid level in the alcoholysis tank within a certain range.

The alcoholysis agent and the alcoholysis catalyst also enter the first alcoholysis tank continuously in a liquid state with a predetermined dosage controlled by a metering pump.

The melt A is obtained after the first alcoholysis is finished in the first alcoholysis tank, and the melt A is continuously fed into the second alcoholysis tank that is connected in series with the first alcoholysis tank, for the second alcoholysis. Similarly, the conveying volume of melt A and the liquid level of the second alcoholysis tank can be adjusted by the pump speed so as to keep the relative stability of the liquid level of the second alcoholysis tank.

Through extensive research, the inventor has discovered the advantage of using the technical scheme of the present invention is that the alcoholysis reaction can be carried out more thoroughly, and the consistency of the degree of alcoholysis can be ensured.

Furthermore, the alcoholysis product, transesterification agent and transesterification catalyst are continuously fed into the transesterification tank for transesterification reaction. Compared with feeding and reaction in batch, the yield and purity of DMT obtained in the transesterification step have been greatly improved in the present disclosure.

Furthermore, the state of waste polyester has a greater impact on the process of heating and impelling the feed in the screw extruder. Thus, the waste polyester to be depolymerized is processed into (5 mm-10 mm)×(5 mm-10 mm) uniform pellets by a densification process. The densification process can adopt conventional techniques, such as densification by rubbing, densification by melting, etc., to pretreat waste polyester. It is easy to understand that one or more of waste polyester bottle flakes, polyester film, polyester fiber, and waste textiles can be processed into uniform pellets as raw material through densification process, or the waste polyester can also be directly purchased and processed into uniform pellets as raw material.

In the present disclosure, the densification by rubbing is a process in which the special rubbing machine is used and the processing temperature is about 180 degrees. In the process of the densification by rubbing, the waste polyester is not completely melted and made into uniform particles. The densification by melting refers to pelletizing by a slicer after melting, the size of the slice is 3×4 mm, and the process temperature must reach about 280 degrees.

Furthermore, through extensive research, the inventor has discovered that the state of waste polyester raw material has a certain influence on the effect of alcoholysis recycling. Before entering the alcoholysis tank, the waste polyester is melted from solid to liquid. Thus, the not-melted impurities can be removed by a filtration process, then the yield and reaction efficiency of alcoholysis recycling is improved, and the energy and equipment costs of subsequent reactions can be saved as much as possible.

In particular, since the melt A fed into the second alcoholysis tank has undergone the first alcoholysis, its relative molar mass and viscosity are lower. Therefore, the filter accuracy of the filter in front of the second alcoholysis tank entered should be higher than the filter in front of the first alcoholysis tank.

In some embodiment, before the step of alcoholysis, the waste polyester is filtered.

Furthermore, the type and dosage of alcoholysis agent have some impact on the depolymerization reaction. If the dosage of the alcoholysis agent is too high, the excessive alcoholysis agent may be mixed in the alcoholysis product, and other by-products are formed in the alcoholysis product. If the dosage amount of alcoholysis agent is too low, it may lead to incomplete alcoholysis, and ere will be more long-chain waste polyester in the alcoholysis product. Both of these conditions will affect the quality stability of the alcoholysis product, thereby affecting the subsequent transesterification reaction. In addition, feeding in batch also has a certain impact on the quality of the alcoholysis product. Only continuous and stable feeding in the balance conditions can ensure the product quality of the alcoholysis product.

In some embodiment, the alcoholysis agent is ethylene glycol. The waste polyester and the alcoholysis agent are continuously fed into the first alcoholysis tank in a weight ratio of 1.0:1.0-2.0.

Furthermore, the type and the dosage of alcoholysis catalyst also have a certain impact on the depolymerization reaction. Through extensive research, the inventor has discovered that potassium carbonate and zinc acetate are the preferred alcoholysis catalysts for polyester alcoholysis. The alcoholysis agent and the alcoholysis catalyst are fed continuously into the first alcoholysis tank together in a liquid state and reacted with the waste polyester in which not-melted impurities has been filtered. Then, the best hydroxyl value and BHET yield can be obtained. Therefore, the dosage of alcoholysis catalyst is controlled within an appropriate range, so the alcoholysis efficiency of waste polyester is ensured, and the waste of catalysts is avoided.

In some embodiment, the alcoholysis catalyst is potassium carbonate or zinc acetate. Based on the weight of the waste polyester, the dosage of the alcoholysis catalyst is 0.3 wt %-3.0 wt %.

Furthermore, the reaction temperature and reaction time in the alcoholysis tank have a certain impact on the quality stability of the product. The temperature of the alcoholysis tank is controlled by the outer heating jacket and the amount of heat medium circulating in the internal coil of the outer heating jacket. The too low alcoholysis temperature is not beneficial to the progress of the alcoholysis reaction, and the too high alcoholysis temperature will cause the occurrence of side reactions.

In some embodiment, an alcoholysis temperature is 180° C.-200° C. and an alcoholysis time is 40 min-90 min in the first alcoholysis tank and the second alcoholysis tank. In other words, the reaction conditions in the first alcoholysis tank are as same as or similar to the reaction conditions in the second alcoholysis tank.

In some embodiment, the transesterification agent is methanol. The waste polyester and the transesterification agent are continuously fed into the first transesterification tank in a weight ratio of 1.0:1.0-3.0.

Furthermore, the type and dosage of the transesterification catalyst have certain impact on the speed of the transesterification reaction and the quality of the product. Increasing the amount of catalyst within a certain range cannot achieve the purpose of accelerating the rate of the transesterification reaction. On the contrary, excessive catalyst may lead to initiate other side reactions, produce other unnecessary by-products, and reduce the quality of the product. A small dosage of catalyst results in slow reaction speed and low reaction efficiency.

In some embodiment, the transesterification catalyst is sodium hydroxide or potassium carbonate. Based on the weight of the waste polyester, the dosage of the transesterification catalyst is 0.2 wt %-5.0 wt %.

Furthermore, the process conditions of the continuous transesterification reaction in the transesterification tank also have a certain impact on the final transesterification reaction product. The composition, activity and interaction of the material in the transesterification reactor should be fully considered in the determination of reaction temperature and reaction time.

In some embodiment, a reaction temperature is 60° C.-75° C. and a reaction time is 30 min-60 min in the first transesterification tank. A reaction temperature is 70° C.-85° C. and a reaction time is 30 min-60 min in the second transesterification tank.

The raw DMT obtained by the transesterification reaction is continuously fed into the intermediate material storage tank and is used for the crystallization, separation and purification of the raw DMT in the next step. The crystallization, separation and purification of raw DMT are carried out by conventional techniques.

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

Please refer to the drawing. The embodiments 1 and 2 both use the following processes for recycling waste polyester material with continuous alcoholysis and transesterification.

1. Melting Waste Polyester (1) Densification of Waste Polyester

The waste polyester can be waste polyester bottle flakes, polyester film, polyester fiber, and waste textiles.

The waste polyester will be processed into pellets via densification processes such as densification by rubbing, densification by melting, etc., and placed in the waste polyester tank 5 for storage.

(2) Drying of Pellets

Drying can be carried out by conventional drying process, in continuous or batch way according to specific requirements. If a continuous drying way is used, the pellets of waste polyester are continuously fed from the waste polyester tank 5 into the drying tower 7 via the rotary feeder 6 for drying to remove moisture.

(3) Filtration of Melted Waste Polyester

The pellets of waste polyester from the drying tower 7 are fed into the screw extruder 9 via the rotary feeder 8 to melt. The melted material is filtered via the filter 10 to remove non-melted impurities, and continuously fed into the alcoholysis tank 21 in a melted state.

2. Alcoholysis of Waste Polyester with EG

The melted material is continuously fed into the alcoholysis tank 21. The conveying amount of waste polyester is adjusted by the speed of the screw extruder 9 which is controlled based on the liquid level of the first alcoholysis tank 21 to achieve relatively stable liquid level of the alcoholysis tank 21.

The EG in the EG storage tank 1 and the alcoholysis catalyst in the alcoholysis catalyst storage tank 3 are respectively fed into the alcoholysis tank 21 through the metering pump 2 and the metering pump 4. The rotation speed of the metering pumps 2 and 4 and the rotation speed of the screw extruder 9 are adjusted in a fixed ratio.

The liquid level in the first alcoholysis tank 21 is relatively stable. Due to the existence of the material in the first alcoholysis tank, the waste polyester which is fed into the first alcoholysis tank 21 in a melted state and stirred by the stirrer 23 is evenly mixed with the original material, the new EG, and the new catalyst, and undergoes homogeneous alcoholysis in the melted state.

The weight ratio of waste polyester to EG is 1:1.0-2.0, the alcoholysis temperature is 180-200° C., and the alcoholysis time is 40-90 min.

The temperature of the first alcoholysis tank is controlled by the outer heating jacket and the amount of heat medium circulating in the internal coil of the outer heating jacket.

The alcoholysis catalyst is potassium carbonate or zinc acetate, and the dosage is 0.3-3.0% of the weight of the waste polyester. The alcoholysis catalyst is added in the form of EG solution and the concentration of the alcoholysis catalyst in EG solution is 10-70%.

The temperature increase in the alcoholysis tank will cause EG to evaporate. The evaporated EG passes through the distillation column 24 and the top condenser 25, and the EG is condensed and returns back to the alcoholysis tank. A small amount of low-boiling substances (such as moisture) in the system is discharged out of the system through the distillation column 24 and the top condenser 25.

The melt A from the first alcoholysis tank 21 is continuously fed into the second alcoholysis tank 31 through the delivery pump 26 to continue alcoholysis. The speed of the delivery pump 26 controls the delivery volume, and the speed of the delivery pump 26 is controlled based on the liquid level of the second alcoholysis tank 31 to ensure that the liquid level in the second alcoholysis tank 31 is relatively stable.

The temperature of the second alcoholysis tank is controlled by the outer heating jacket and the amount of heat medium circulating in the internal coil of the outer heating jacket.

The temperature increase in the second alcoholysis tank will cause EG evaporate. The evaporated EG passes through the distillation column 34 and the top condenser 35 and the EG is condensed and returns back to the alcoholysis tank. In addition, a small amount of low-boiling substances in the system is discharged out of the system through the distillation column 34 and the top condenser 35.

In the second glycolysis tank 31, the alcoholysis temperature is 180° C.-200° C., and the alcoholysis time is 40 min-90 min.

3. Transesterification

The said alcoholysis product is continuously transported by the delivery pump 36, filtered by the filter 37, and then continuously fed into the first transesterification tank 41. The speed of the delivery pump 36 is controlled based on the liquid level of the transesterification tank 41 to ensure that the liquid level of the first transesterification tank 41 is relatively stable.

The flow of the methanol from the methanol storage tank 46 and the flow of the catalyst from the transesterification catalyst storage tank 48 are controlled by the metering pump 47 and the metering pump 49 respectively and fed into the transesterification tank. The rotation speed of the metering pump 47, the metering pump 49 and the rotation speed of the delivery pump 36 for the alcoholysis product are set in a fixed ratio.

The weight ratio of the alcoholysis product to methanol is indirectly represented as the original waste polyester to methanol, and the original waste polyester to methanol is 1:1-3.0. The reaction temperature is 70° C.-85° C., and the reaction time is 30 min-60 min in the transesterification reaction with the catalyst.

The transesterification catalyst is sodium hydroxide or potassium carbonate. The dosage of the transesterification catalyst is 0.2-5.0% of the weight of the alcoholysis product, preferably 0.3-2.0%. The transesterification catalyst is added in the form of EG solution and the concentration of the transesterification catalyst in the EG solution is 10-70%.

The temperature of the transesterification tank 41 is controlled by the amount of heat medium circulating in the internal coil of the outer heating jacket.

The temperature increase in the transesterification tank 41 will cause methanol to evaporate. Through the distillation column 44 and the top condenser 45, the methanol is condensed and return back to the transesterification tank.

The product in the first transesterification tank is continuously fed into the second transesterification tank 51 through the delivery pump 50. The rotation speed of the delivery pump 50 is controlled based on the liquid level of the second transesterification tank 51 to ensure that the liquid level of the second transesterification tank 51 is relatively stable.

A temperature increase in the second transesterification tank 51 will cause methanol to evaporate. The methanol is condensed and returns back the transesterification tank through the distillation column 54 and the top condenser 55.

The temperature of the second transesterification tank 51 is adjusted by the amount of the circulated heat medium.

The reaction temperature is 60-75° C., and the reaction time is 30-60 min in the second transesterification tank 51.

4. Crystallization of DMT

The transesterification product from the second transesterification tank is continuously transported by the material pump 56 and filtered by the filter 57 and then continuously fed into the DMT crystallizer 61.

In the crystallizer 61, the DMT is crystallized out because the temperature of the material is lowered to below 40° C.

The material in the DMT crystallizer 61 is filtered to obtain a raw DMT filter cake and a filtrate. The filter cake was washed with methanol to obtain a raw DMT filter cake. The raw DMT filter cake is washed repeatedly with methanol and filtered 2-3 times, to obtain a DMT filter cake.

The filtrate is combined and reused in the transesterification reaction, or after distillation and purification, the methanol is used in the transesterification reaction.

5. Purification of DMT

DMT filter cake is purified and distilled to make pure DMT.

DMT distillation and purification are carried out under vacuum conditions. For example, DMT filter cake is purified in a pressure of 6 Kpa and a temperature of 200° C. to obtain pure DMT.

In the embodiment 1, the raw material is the pellets of waste polyester in which the average particle size is ≤10 mm and the moisture content is ≤0.5%. The melting temperature of screw extruder 7 is 285° C. The filtering accuracy of filter 8 is 150 μm. The melted material is continuously fed into the alcoholysis tank 21 at a rate of 1000 kg/hr. The feed rate of EG is 1500 kg/hr. The catalyst is an ethanol solution containing potassium carbonate (the concentration of potassium carbonate is 25%). The feed rate of the solution containing potassium carbonate is 80 kg/hr. The alcoholysis temperature is 190° C., and the material residence time (alcoholysis time) is 60 min. The filtration accuracy of the filter 27 is 80 μm. the temperature in the second alcoholysis 31 is set in 195° C., and the alcoholysis time is set to 50 min. The content of BHET monomer in the obtained alcoholysis product is 75%. The total content of monomers, dimers, trimers and tetramers is 97%. The dosage of potassium carbonate as the transesterification catalyst is 2.0% of the weight of the alcoholysis product, the reaction temperature is 65° C. and the reaction time is 50 min in the transesterification reaction. The material in the first transesterification tank is continuously fed into the second transesterification tank 51 by the melting pump 50. The reaction temperature is 75° C. and the reaction time is 40 min in the second transesterification tank 51. The raw DMT product from the second transesterification tank is fed into the DMT crystallizer, and the temperature of the material is lowered to below 40° C. The DMT is crystallized out and filtered to obtain raw DMT filter cake and filtrate. The raw DMT filter cake is washed with methanol several times to obtain a DMT filter cake. T The DMT filter cake is purified by a short-flow rectification system in a pressure of 6 Kpa and a temperature of 200° C. to obtain pure DMT. The purity of DMT is 99.5% and the yield is 95%.

In the embodiment 2, the only difference is that the raw material is changed into waste polyester film instead of pellet and processed into 5-10 mm×5-10 mm fragments, and the other steps are the same as in the embodiment 1.

A comparative embodiment 1 provides a method for recycling waste polyester by continuous alcoholysis and non-continuous transesterification.

In the comparative embodiment 1, the alcoholysis and the previous steps are the same as in the embodiments 1 and 2. The difference is that the alcoholysis product in the second alcoholysis tank is in batch added to the transesterification tank 41 at one time. The methanol, the transesterification catalyst and alcoholysis product are added into the transesterification tank 41 in a fixed ratio. The alcoholysis material and methanol undergo transesterification in the presence of the transesterification catalyst to generate raw DMT. The weight ratio of the alcoholysis product to methanol is indirectly represented as the original waste polyester to methanol, and the original waste polyester to methanol is 1:2. In the presence of a catalyst, the reaction temperature is 75° C., and the reaction time is 70 min in the transesterification reaction.

The catalyst is potassium carbonate, and the dosage of potassium carbonate is 2.0% of the waste polyester. Potassium carbonate is added in the form of EG solution, and the concentration of potassium carbonate in EG solution is 25%. The purity of DMT obtained by this method is 99.5%, and the yield is 92%.

Comparative Embodiment 2

The raw material is the pellets made of waste polyester, in which the average particle size is ≤10 mm and the moisture content is ≤0.5%.

The difference from the comparative embodiment 1 is that in the step of alcoholysis 1500 kg of EG, 80 kg of 25% ethylene glycol solution containing potassium carbonate and 1000 kg of waste polyester pellets are added into and stirred in the alcoholysis tank 21. The alcoholysis tank 21 contains 2000 kg of alcoholysis material of the same composition initially. Then, the temperature was gradually increased to 190° C. for alcoholysis reaction, the reaction temperature is 190° C., and the reaction time is 60 min. After sample analysis of the alcoholysis product, the content of BHET monomers in alcoholysis product is 63% and the total content of monomers, dimers, trimers and tetramers is 83%.

The material in the alcoholysis tank 21 is filtered by the filter 27 and fed into the transesterification tank 41 in batch at one time, and 2000 kg of the remaining material in the alcoholysis tank 21 is used for the next alcoholysis. The filtration accuracy of the filter 27 is 80 μm. 2000 kg of methanol and the transesterification catalyst, i.e. potassium carbonate, is added into the transesterification tank 41 to carry out the transesterification reaction. The dosage of potassium carbonate is 2.0% of the waste polyester. Potassium carbonate is added in the form of EG solution, and the catalyst concentration in the EG solution is 25%. The reaction temperature is 75° C., and the reaction time is 70 minutes.

The above-mentioned transesterification product is fed into the DMT crystallizer, and the temperature of the material is lowered to below 40° C., and the DMT is crystallized out. The raw DMT filter cake and filtrate are obtained by filter. The raw DMT filter cake is washed with methanol several times to obtain a DMT filter cake. The DMT filter cake is purified by a short-flow rectification system in a pressure of 6 Kpa and a temperature of 200° C. to obtain pure DMT. The purity of DMT recycled by the above method was 99.4%, and the yield was 78%.

We claim:

1. A method for recycling waste polyester with continuous alcoholysis and transesterification comprising:
    material pretreatment: drying and deoxygenating waste polyester material to obtain waste polyester as raw material;
    alcoholysis: after the material pretreatment, the waste polyester raw material, an alcoholysis agent and an alcoholysis catalyst are continuously fed into a first alcoholysis tank in the melted state for a first alcoholysis to obtain a melt A, and then the melt A is continuously fed into a second alcoholysis tank for a second alcoholysis through a delivery pump to obtain alcoholysis product, wherein the first alcoholysis tank and the second alcoholysis tank are connected in series; wherein the conveying amount of the waste polyester is adjusted by the speed of a screw extruder which is controlled based on the liquid level of the first alcoholysis tank, and the speed of the delivery pump is controlled based on the liquid level of the second alcoholysis tank;
    transesterification: including carrying out transesterification reaction in the transesterification tank to obtain a transesterification product, and crystallization, separation and purification of raw dimethyl terephthalate (DMT);
    wherein the transesterification tank includes a first transesterification tank and a second transesterification tank, the first transesterification tank and the second transesterification tank are connected in series;
    the alcoholysis product, the transesterification agent, and the transesterification catalyst are continuously fed into the first transesterification tank in the melted state for the first transesterification to obtain the transesterification product;
    the second transesterification tank is configured to place the transesterification product that is continuously fed from the first transesterification tank for a second transesterification.

2. The method for recycling waste polyester with continuous alcoholysis and transesterification of the claim 1, wherein before the step of alcoholysis the waste polyester raw material is filtered.

3. The method for recycling waste polyester with continuous alcoholysis and transesterification of the claim 1, wherein the alcoholysis agent is ethylene glycol, and the waste polyester raw material and the alcoholysis agent are continuously fed into the first alcoholysis tank in a weight ratio of 1.0:1.0-2.0.

4. The method for recycling waste polyester with continuous alcoholysis and transesterification of the claim 1, wherein the alcoholysis catalyst is potassium carbonate or zinc acetate; based on the weight of the waste polyester the dosage of the alcoholysis catalyst is 0.3 wt %-3.0 wt %.

5. The method for recycling waste polyester with continuous alcoholysis and transesterification of the claim 3, wherein an alcoholysis temperature is 180° C.-200° C. and an alcoholysis time is 40 min-90 min in the first alcoholysis tank and the second alcoholysis tank.

6. The method for recycling waste polyester with continuous alcoholysis and transesterification of the claim 4, wherein an alcoholysis temperature is 180° C.-200° C. and an alcoholysis time is 40 min-90 min in the first alcoholysis tank and the second alcoholysis tank.

7. The method for recycling waste polyester with continuous alcoholysis and transesterification of the claim 1, wherein the transesterification agent is methanol, and the waste polyester raw material and the transesterification agent are continuously fed into the first transesterification tank in a weight ratio of 1.0:1.0-3.0.

8. The method for recycling waste polyester with continuous alcoholysis and transesterification of the claim 7, wherein a reaction temperature is 60° C.-75° C. and a reaction time is 30 min-60 min in the first transesterification tank.

9. The method for recycling waste polyester with continuous alcoholysis and transesterification of the claim 1, wherein the transesterification catalyst is sodium hydroxide or potassium carbonate, the dosage of the transesterification catalyst is 0.2 wt %-5.0 wt % of the waste polyester.

10. The method for recycling waste polyester with continuous alcoholysis and transesterification of the claim 9, wherein a reaction temperature is 60° C.-75° C. and a reaction time is 30 min-60 min in the first transesterification tank.

11. The method for recycling waste polyester with continuous alcoholysis and transesterification of the claim 10, wherein a reaction temperature is 70° C.-85° C. and a reaction time is 30 min-60 min in the second transesterification tank.

12. The method for recycling waste polyester with continuous alcoholysis and transesterification of the claim 3, wherein a temperature increasing in the first alcoholysis tank causes ethylene glycol to evaporate, and the evaporated ethylene glycol passes through a distillation column and a top condense, and the ethylene glycol is condensed and returns back to the first alcoholysis tank.

* * * * *